(12) United States Patent
Nightengale et al.

(10) Patent No.: US 11,775,976 B2
(45) Date of Patent: Oct. 3, 2023

(54) MERCHANT FRAUD RISK SCORE

(71) Applicant: Visa International Service Association, San Francisco, CA (US)

(72) Inventors: Brad Nightengale, Redwood Shores, CA (US); Karl Newland, Pacifica, CA (US); Kevin Siegel, Mountain View, CA (US); Zhongxiao Jiang, Cupertino, CA (US); Sharon Rowberry, Santa Rosa, CA (US)

(73) Assignee: Visa International Service Association, San Francisco, CA (US)

( * ) Notice: Subject to any disclaimer, the term of this patent is extended or adjusted under 35 U.S.C. 154(b) by 94 days.

(21) Appl. No.: 17/462,644

(22) Filed: Aug. 31, 2021

(65) Prior Publication Data

US 2021/0398130 A1    Dec. 23, 2021

Related U.S. Application Data

(63) Continuation of application No. 15/156,720, filed on May 17, 2016, now Pat. No. 11,132,686, which is a (Continued)

(51) Int. Cl.
  *G06Q 20/20*   (2012.01)
  *G06Q 20/40*   (2012.01)
  (Continued)

(52) U.S. Cl.
  CPC ......... *G06Q 20/4016* (2013.01); *G06Q 20/20* (2013.01); *G06Q 20/40* (2013.01); *H04L 61/5007* (2022.05); *H04L 2101/668* (2022.05)

(58) Field of Classification Search
  CPC .... G06Q 20/4016; G06Q 20/20; G06Q 20/40; H04L 61/5007; H04L 1201/668
  (Continued)

(56) References Cited

U.S. PATENT DOCUMENTS 6,006,211 A    12/1999   Sansone et al.
6,516,056 B1   2/2003    Justice et al.
(Continued)

FOREIGN PATENT DOCUMENTS

WO    2011119761       9/2011
WO    2011119761 A3    4/2012

OTHER PUBLICATIONS

Dhameka et al., "Clarifying liability for twenty-first-century payment fraud", Economic Perspectives 37.3: 107(23), Federal Reserve Bank of Chicago, Oct.-Dec. 2013.*
(Continued)

*Primary Examiner* — Frantzy Poinvil
(74) *Attorney, Agent, or Firm* — Kilpatrick Townsend & Stockton LLP

(57) ABSTRACT

Methods and systems are presented for a fraud risk score to be given to a merchant for a proposed transaction with a consumer. The fraud risk score is generated by a payment account service provider, such as a credit card processor, using information from a pending transaction as well as information from other payment accounts that the consumer holds to which the payment account service provider is privy. Various factors, including indicators of elevated risk in other payment accounts, are custom-weighted by the merchant for the score.

20 Claims, 8 Drawing Sheets

Related U.S. Application Data continuation of application No. 14/100,690, filed on Dec. 9, 2013, now abandoned, which is a continuation of application No. 13/053,504, filed on Mar. 22, 2011, now Pat. No. 8,626,663.

(60) Provisional application No. 61/316,483, filed on Mar. 23, 2010.

(51) Int. Cl.
    *H04L 61/5007*    (2022.01)
    *H04L 101/668*    (2022.01)

(58) Field of Classification Search
    USPC .............................................. 705/3–44, 318
    See application file for complete search history.

(56) References Cited

U.S. PATENT DOCUMENTS

| | | | |
|---|---|---|---|
| 6,783,065 | B2 | 8/2004 | Spitz et al. |
| 7,263,506 | B2 | 8/2007 | Lee et al. |
| 7,403,922 | B1 | 7/2008 | Lewis et al. |
| 7,543,740 | B2 | 6/2009 | Greene et al. |
| 7,673,793 | B2 | 3/2010 | Greene et al. |
| 7,731,089 | B2 | 6/2010 | Chang et al. |
| 7,809,650 | B2 | 10/2010 | Bruesewitz et al. |
| 8,019,678 | B2 | 9/2011 | Wright et al. |
| 8,589,298 | B2 | 11/2013 | Choudhuri et al. |
| 8,626,663 | B2 | 1/2014 | Nightengale et al. |
| 8,630,942 | B2 | 1/2014 | Felger |
| 8,666,841 | B1* | 3/2014 | Claridge ................ G06Q 30/00 705/26.1 |
| 8,666,861 | B2 | 3/2014 | Li et al. |
| 8,676,684 | B2 | 3/2014 | Newman et al. |
| 9,189,788 | B1* | 11/2015 | Robinson ......... G06Q 20/40145 |
| 2002/0099649 | A1 | 7/2002 | Lee et al. |
| 2002/0120846 | A1 | 8/2002 | Stewart et al. |
| 2002/0152160 | A1 | 10/2002 | Allen-Rouman et al. |
| 2002/0194119 | A1 | 12/2002 | Wright et al. |
| 2003/0069820 | A1 | 4/2003 | Hillmer et al. |
| 2003/0191709 | A1 | 10/2003 | Elston et al. |
| 2003/0229519 | A1 | 12/2003 | Eidex et al. |
| 2004/0172340 | A1 | 9/2004 | Bishop et al. |
| 2004/0199462 | A1 | 10/2004 | Starrs |
| 2004/0230527 | A1 | 11/2004 | Hansen et al. |
| 2005/0149455 | A1 | 7/2005 | Bruesewitz et al. |
| 2006/0068755 | A1* | 3/2006 | Shraim ................ H04M 15/47 455/410 |
| 2006/0149674 | A1 | 7/2006 | Cook et al. |
| 2007/0106582 | A1 | 5/2007 | Baker et al. |
| 2007/0112667 | A1 | 5/2007 | Rucker |
| 2007/0174164 | A1 | 7/2007 | Biffle et al. |
| 2007/0282674 | A1 | 12/2007 | Gomes et al. |
| 2007/0299777 | A1* | 12/2007 | Shraim ................ H04L 51/212 705/51 |
| 2008/0033877 | A1 | 2/2008 | Blair et al. |
| 2008/0140576 | A1* | 6/2008 | Lewis .................. G06Q 30/02 707/999.107 |
| 2008/0155547 | A1 | 6/2008 | Weber et al. |
| 2008/0288385 | A1 | 11/2008 | Geschwender et al. |
| 2008/0288405 | A1 | 11/2008 | John |
| 2008/0308624 | A1 | 12/2008 | Gardner et al. |
| 2009/0106151 | A1 | 4/2009 | Nelsen et al. |
| 2009/0132347 | A1 | 5/2009 | Anderson et al. |
| 2009/0271303 | A1 | 10/2009 | Weng et al. |
| 2009/0283591 | A1 | 11/2009 | Silbernagl |
| 2010/0057622 | A1 | 3/2010 | Faith et al. |
| 2011/0238575 | A1 | 9/2011 | Nightengale et al. |
| 2011/0276468 | A1 | 11/2011 | Lewis et al. |
| 2012/0158590 | A1 | 6/2012 | Salonen |
| 2013/0024339 | A1 | 1/2013 | Choudhuri et al. |
| 2014/0095393 | A1 | 4/2014 | Nightengale et al. |
| 2015/0012436 | A1 | 1/2015 | Poole et al. |
| 2015/0026027 | A1* | 1/2015 | Priess ..................... G06Q 10/04 705/35 |
| 2015/0142595 | A1 | 5/2015 | Acuna-Rohter |
| 2015/0287046 | A1 | 10/2015 | Richards et al. |
| 2016/0027008 | A1 | 1/2016 | John |
| 2016/0078443 | A1 | 3/2016 | Tomasofsky et al. |
| 2016/0078444 | A1* | 3/2016 | Tomasofsky ............ G06F 21/34 705/44 |
| 2016/0104133 | A1* | 4/2016 | Davis ..................... G06Q 20/10 705/39 |
| 2016/0171499 | A1* | 6/2016 | Meredith ............ G06Q 20/4016 705/44 |
| 2016/0203491 | A1 | 7/2016 | Ranganathan et al. |
| 2016/0260102 | A1 | 9/2016 | Nightengale et al. |
| 2018/0025442 | A1* | 1/2018 | Isaacson ................ H04L 51/48 705/26.62 |

OTHER PUBLICATIONS

U.S. Appl. No. 13/053,504 , "Final Office Action", dated Feb. 21, 2013, 12 Pages.
U.S. Appl. No. 13/053,504 , "Non-Final Office Action", dated Jun. 26, 2012, 13 pages.
U.S. Appl. No. 13/053,504 , "Notice of Allowance", dated Sep. 6, 2013, 15 pages.
U.S. Appl. No. 14/100,690 , "Final Office Action", dated May 3, 2019, 12 pages.
U.S. Appl. No. 14/100,690 , "Final Office Action", dated Jan. 9, 2018, 19 pages.
U.S. Appl. No. 14/100,690 , "Non-Final Office Action", dated Aug. 11, 2017, 15 pages.
U.S. Appl. No. 14/100,690 , "Non-Final Office Action", dated Sep. 21, 2018, 17 pages.
U.S. Appl. No. 15/156,720 , "Final Office Action", dated Feb. 2, 2021, 12 pages.
U.S. Appl. No. 15/156,720 , "Final Office Action", dated Mar. 6, 2020, 8 pages.
U.S. Appl. No. 15/156,720 , "Non-Final Office Action", dated Jun. 28, 2019, 12 pages.
U.S. Appl. No. 15/156,720 , "Non-Final Office Action", dated Jan. 14, 2019, 14 pages.
U.S. Appl. No. 15/156,720 , "Non-Final Office Action", dated Jul. 9, 2020, 8 pages.
U.S. Appl. No. 15/156,720 , "Notice of Allowance", dated Jun. 4, 2021, 10 pages.
Brown , "Electronic Commerce: Who Carries the Risk of Fraud", The Journal of Information, Law & Technology, Jul. 2000.
Gregg et al., "The Role of Reputation Systems in Reducing On-Line Auction Fraud", International Journal of Electronic Commerce, vol. 10, No. 3, Stable URL: http://www.jstor.org/stable/27751194, 2006), pp. 95-120.
PCT/US2011/029665 , "International Search Report and Written Opinion", dated Dec. 7, 2011, 9 pages.
Tufts , "Viewpoints on Payments Fraud: Taking the Lead in Controlling Payment Fraud", Payments System Report. Herndon, vol. 13, Issue 6, 1998, 10 pages.

\* cited by examiner

FIG. 2

MERCHANT FRAUD RISK SCORE

CROSS-REFERENCES TO RELATED APPLICATIONS

This application is a continuation of U.S. application Ser. No. 15/156,720, filed May 17, 2016, now U.S. Pat. No. 11,132,686, which is a continuation of U.S. application Ser. No. 14/100,690, filed Dec. 9, 2013, which is a continuation of U.S. application Ser. No. 13/053,504, filed Mar. 22, 2011, now U.S. Pat. No. 8,626,663, which claims the benefit of U.S. Provisional Application No. 61/316,483, filed Mar. 23, 2010, which are hereby incorporated by reference in their entireties for all purposes.

BACKGROUND

1. Field of the Art

Systems and methods are disclosed for analyzing fraud and other risks in transactions, determining scores based on those risks, and providing the scores to merchants. Specifically, providing risk scores based on billing and shipping address inconsistencies and other indicators of fraud activity in Card Not Present (CNP) and other transactions to subscribing merchants is described.

2. Discussion of the Related Art

The impact of fraud within a credit card, debit card, or other payment card transaction lifecycle is far reaching, starting from the merchants' submission of the transaction, up through the response provided by an issuer, to tender of a purchased item. In many transactions, banks bear the burden of paying for fraud. If a thief uses a stolen credit card, a merchant's bank or the cardholder's bank pays the cost of the item. However, in CNP transactions, the merchant typically bears the risk of fraud. As more and more purchases are made online and otherwise as CNP transactions, merchants are increasingly exposed to such fraud.

An "issuer" is a bank or other financial institution that offers credit card, debit card, or other payment accounts for use by consumers. The payment accounts are often branded by and subject to rules promulgated by payment service providers, such as Visa. Payment service providers are also known as payment processors and payment networks.

An "acquirer" is a bank or other financial institution that offers payment acceptance services by credit card, debit card, or other payment accounts. Acquirers often contract with merchants to service their credit and other payment card transactions.

A "merchant" is a seller of goods, services, information, etc. A merchant may be one meeting the definition in the Uniform Commercial Code (UCC) or one who merely conducts a transaction as a merchant.

A "payment account" includes credit card, debit card, and other payment card accounts as well as savings, checking, and other financial accounts. Payment accounts can include those for government currencies as well as non-government currencies, such as casino chips, Zynga® dollars, airline/hotel miles, and reward points. Payment accounts can be credited or debited for any valuable consideration.

Currently, issuers can use advanced authorization algorithms developed by payment processing systems to assist in reducing the negative impacts from fraud risk. Due to shifts in liability, merchants are responsible for transactions where the card is used in a CNP situation or where there is no card.

A CNP situation can occur when, for example, a customer does not have his card on him at a store but the customer remembers his card number and expiration date and provides them to a store employee. Another CNP situation can occur when a customer purchases something through a merchant's online web site. Because a representative of the merchant is not there to see the card, the customer's card is deemed not present.

An exception to CNP situations in which a merchant does not assume the risk of the transaction is in a verification program by a service provider (e.g. Verified by Visa® authentication). In this situation, the service provider assumes liability for the transaction.

As the CNP segment of transactions continues to grow and experience an increase in fraud, merchants are more anxious to receive assistance from service providers in the form of a product that can be used, in a real-time manner, to aid in reducing fraud.

BRIEF SUMMARY

Embodiments in accordance with disclosures herein generally relate to merchant fraud risk scores for CNP and other transactions that are provided to merchants. The merchant fraud risk scores can be based on the risk that their respective transactions will lose money for the merchant due to inconsistent addresses (e.g., inconsistent billing and shipping addresses), a history of chargebacks or other indicators of nuisance, inconsistent Internet Protocol (IP) address and customer data, the velocity of purchases on other accounts, and other data on different accounts related to the transacting consumer. The different accounts of a consumer can be identified by an account service provider, such as Visa. The service provider can be uniquely privy to different accounts held by the same consumer. The merchant fraud risk score can be provided with an authorization response message at the time of transaction through periodic downloads to a merchant, in response to telephone calls, or in other instances.

An embodiment in accordance with the present disclosure relates to a method for determining and providing a risk score to a merchant. The method includes receiving from a merchant an authorization request message for a payment from a first payment account, the authorization request message specifying at least a portion of a billing address and a portion of a shipping address, identifying a mismatch between the billing address and the shipping address, ascertaining that the first payment account is associated with a second payment account, the second payment account experiencing an elevated risk, determining, using a processor operatively coupled to a memory, a fraud risk score based on weighting the mismatch and the elevated risk using a weighting specified by the merchant, and providing the fraud risk score to the merchant The method can further include inserting the fraud risk score in an authorization approval message and sending the authorization approval message to the merchant in response to the authorization request message.

An embodiment in accordance with the present disclosure relates to a method for determining and providing a risk score to a merchant. The method includes receiving from a merchant an authorization request message for a payment from a payment account of an accountholder, identifying an elevated risk from data in the authorization request message, ascertaining an elevated risk corresponding to another payment account of the accountholder, determining, using a processor operatively coupled to a memory, a fraud risk score based on a merchant-specified weighting of the elevated risks, and providing the fraud risk score to the merchant.

An embodiment in accordance with the present disclosure relates to a method for rejecting a transaction based on a merchant-specified weighting for fraud scores. The method includes specifying a merchant-specified weighting for fraud risk scores, beginning a sales transaction with a customer, sending to a service provider an authorization request message for a payment from a payment account of an accountholder, receiving an authorization approval message from an issuer and a fraud risk score from the service provider, the fraud risk score based upon the merchant-specified weighting, information within the authorization request message, and risk information of other payment accounts of the accountholder privy to the service provider, and automatically denying, using a processor operatively coupled to a memory, the transaction with the customer based on the fraud risk score notwithstanding an approval from the issuer indicated by the authorization approval message.

"Automatic" denials of transactions include those that occur without human intervention in a computing process. An automatic denial can include a computer generated warning to a store employee not proceed with a transaction.

Other embodiments relate to machine-readable tangible storage media and computer systems that employ or store instructions for the methods described above.

A further understanding of the nature and the advantages of the embodiments disclosed and suggested herein may be realized by reference to the remaining portions of the specification and the attached drawings.

BRIEF DESCRIPTION OF THE DRAWINGS

FIG. 2 illustrates a merchant fraud risk scoring flow in accordance with an embodiment.

Figure 1:
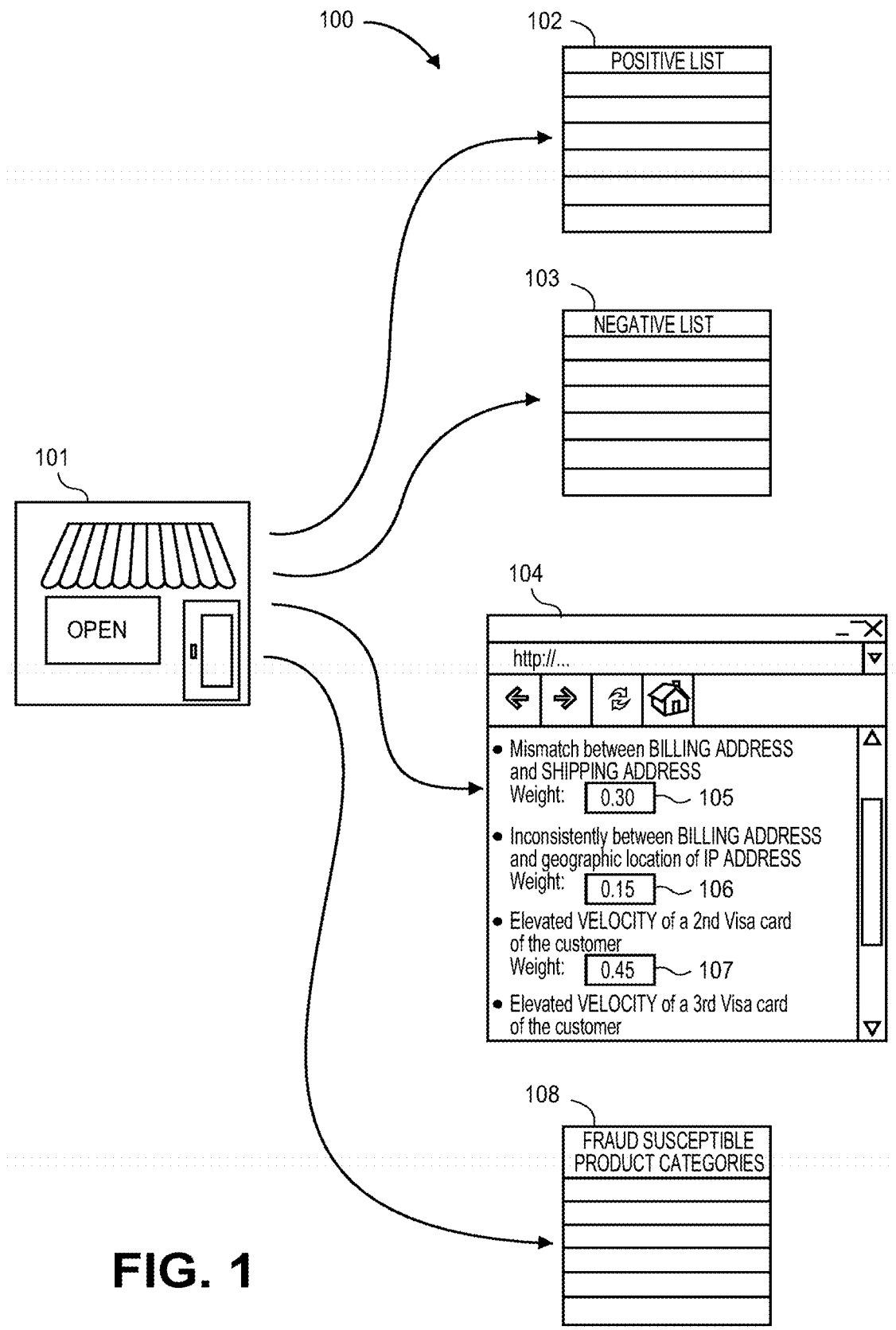
FIG. 1 illustrates merchant-specified data and weightings in accordance with an embodiment.

The figures will now be used to illustrate different embodiments in accordance with the invention. The figures are specific examples of embodiments and should not be interpreted as limiting embodiments, but rather exemplary forms and procedures.

DETAILED DESCRIPTION

Methods and systems are presented for determining a transaction fraud risk score based on transaction-specific data from a potential transaction along with data from the consumer's other payment accounts. Inconsistencies and other indicators of elevated risk are weighted together using weightings specified by and/or particular to a merchant to form the score. The fraud risk score can be created "in flight" and sent in an authorization message back to the vendor in the same channels and messages as normal credit/debit card authorizations. Upon viewing the fraud risk score, which is customized to the merchant, based upon a customer's proposed transaction, and privy to the status of related payment cards, the merchant can reject going ahead with the transaction.

Card Not Present transactions, in which the risk of fraud is often borne entirely by the merchant, can be rejected or accepted based upon quantitative data reflecting more than just the transaction or account proposed for the transaction. The rejection or acceptance can be based upon a mix of the above along with risk indicators in related accounts. For example, an online credit card purchase can be halted because not only is the billing address different from the shipping address, but also because a debit card in the same household is experiencing an elevated purchase velocity. That the two cards are related by being owned by members of the same household may be information only privy to an account service provider.

"Elevated risk" includes unusual or abnormal payment account activity, such as account flags, elevated velocity (in rate or value) of purchases, inconsistencies in geographic locations, anomalous purchases or behavior, or other indicators of risk. Elevated risk can also include a history of chargebacks, incidences of abuse of an account, or other indicators of nuisance by an authorized accountholder.

A "chargeback" is an instance of returning funds to a consumer from a transaction. A consumer may be dissatisfied with a piece of merchandise because it is broken, doesn't work as advertised, he has buyer's remorse, etc. The customer may wish to return the merchandise and get his or her money back. Although a merchant may voluntarily take back the merchandise to give a credit, sometimes the merchant is unconvinced that the reason for the return is justified under the circumstances. The cost of restocking the merchandise, as well as accounting costs, can outweigh the benefit of goodwill that the merchant retains after taking back merchandise. A chargeback, however, can force a merchant to return funds to a consumer. The chargeback may be mandated by consumer protection laws, such as U.S. Federal Reserve regulations.

The number of chargebacks that a consumer initiates can be in indicator of fraud. For example, some unscrupulous consumers order merchandise by mail, receive the merchandise, and then fraudulently report that they never received it. They demand a chargeback, resulting in the merchant losing both the merchandise and the funds that the consumer put up to purchase and ship the merchandise. A plethora of chargebacks in the history of a consumer's account or accounts can indicate that the consumer may be more prone to initiating a chargeback in a current transaction. For example, if the consumer has initiated 3, 5, 10, or more chargebacks in the last week, month, quarter, year, or more, the consumer may be too much trouble for the merchant to proceed with the transaction.

In addition to chargebacks, the risk engine can look at other nuisance data, such as the frequency that a customer, across all his or her accounts, returns merchandise. Particularly, a merchant may be interested in whether the consumer frequently (e.g., every other purchase, every X purchases) returns the type of merchandise or whether the consumer frequently (e.g. thrice in the last month, year) returns to merchants of the same category code.

In some embodiments, fraud risk scores can be sent in batch to a merchant. For example, all online purchase orders to a company may be analyzed and scored overnight, and a batch of fraud risk scores can be sent in one message to the merchant for the next-day's processing of orders.

Individual products or classes of products may be identified with higher risks of fraud. For example, expensive televisions and electronics, high-end sports shoes, or aftermarket auto parts may have higher incidences of attempted purchases with stolen credit cards. A merchant who specifically deals with aftermarket auto parts may be able to distinguish some product lines for which there is little fraud from products where there is a higher incidence of fraud. Honda Civic muffler accessories may be weighted differently than those for GM Oldsmobile Ninety Eights. The merchant may wish to weight the various products for a more customized fraud score for its consumers. Other merchants, such as general retailers with a relatively small section of their stores dedicated to such items, may wish to rate all aftermarket auto accessories in the same class.

Merchant fraud risk scores for CNP and other transactions can be provided directly or indirectly to merchants so that they can determine whether to conduct a transaction with a particular consumer or assess their risk of past transactions with consumers. A merchant fraud risk score for a potential transaction can be based on an estimate of risk that the transaction will lose money for the merchant. The risk score can be based on the other party's (e.g., the consumer's) history of chargebacks, inconsistent Internet Protocol (IP) address, a history of 'testing' on an account, a velocity of purchases on accounts, and other data. The merchant fraud risk score can be provided with an authorization response message at the time of transaction, through periodic downloads to a merchant, in response to a call by a merchant, or at other times.

In some embodiments, an online global model can be created that will score all payment processing network e-Commerce or Mail Order or Telephone (MOTO) transactions as well as unattended acceptance terminal transactions using the data from certain predetermined portions of the authorization request message and the data from the associated authorization response message.

In some embodiments, all authorization response messages can be passed to the scoring module. All e-Commerce, MOTO, and unattended acceptance terminal transactions may be scored while information from the other transactions will be processed and/or stored. The calibrated and raw scores can be logged for later analysis.

An automated billing process at the MVV level, similar to an advanced authorization billing process, may be created to bill subscribing clients when the score is populated with a value of 01-99. The score may be populated on certain transactions for non-subscriber, but these may not be counted for billing since nothing should have been sent to the endpoint.

Some current fraud risk models do not incorporate some important merchant information such as a shipping address, billing address, IP address, and product stock-keeping unit (SKU) information. Embodiments can incorporate this information as well as other information. In addition to a fraud risk score, condition codes can be provided that offer descriptive information about the transaction to help with manual review rates.

Data can be country-specific transactional data, channel specific (e.g. card not present, unattended device, and automated fuel dispenser) transaction data, performance data including fraud transactions and possible compromise and testing data reported into the payment processing system, and optionally merchant specific data.

If the transaction is through the merchant's online web site, whether the customer's Internet Protocol (IP) address is in the same geographic location as his or her residence may contribute to the score. For example, if a person resides in the U.S. but is using a computer in the .UK global domain, then the risk score can be elevated.

FIG. 1 illustrates merchant-specified data and weightings in accordance with an embodiment. Merchant 101 can specify merchant-specified data 100 such as positive list 102, negative list 103, weightings 105-107, and fraud susceptible product categories list 108. A merchant can enter or upload such data on a web site associated with the merchant's acquirer bank or directly with a service provider.

A positive list includes names, addresses, or other identifying information regarding customers that a merchant generally trusts. If a name is on the positive list, then it can override negative fraud scores. Conversely, a negative list includes names, addresses, or other identifying information regarding customers that a merchant generally does not trust. If a name is on the negative list, then a proposed transaction with the consumer can be automatically denied regardless of a fraud score.

Merchant 101 can enter the data on a web page through web browser window 104. The web page can ask for weightings for certain indicators of risk, including a weighting 105 for a mismatch between a billing and shipping address, weighting 106 for an inconsistency between a billing address and a geographic location of the customer's computer's IP address, and weighting 107 for an elevated velocity of a second card of the customer.

Merchant 101 can also upload list 108 of fraud susceptible product categories. If a product being purchase is the same as one listed in the list, then a risk score can be elevated.

Merchant 101 enters the data and weightings at his or her leisure, adjusting and uploading additional data as necessary. Merchant may update some data periodically, such as positive list 102 and negative list 103. Other updates can be event-driven, such as updating fraud susceptible product categories list 108 when a new product is about to be sold.

Figure 2:
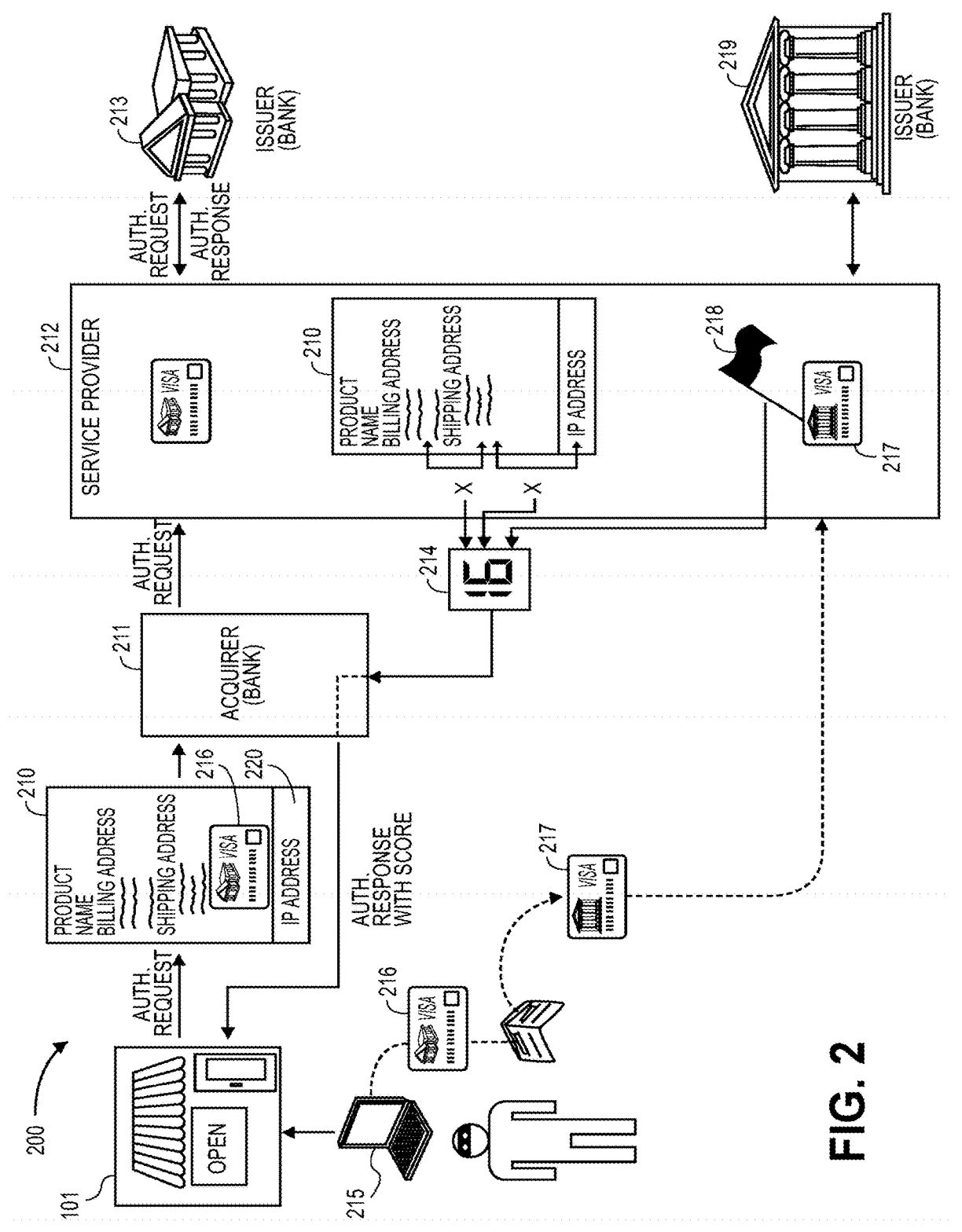

FIG. 2 illustrates merchant fraud risk scoring flow in accordance with an embodiment. A thief has stolen a cardholder's wallet and begun using different payment cards found in the wallet.

The thief attempts to transact with merchant 101 by filling his online shopping cart on the merchant's web site, entering information from stolen credit card 216, and then clicking 'finish' in order to check out. Merchant 101 sends, through a card reader, terminal, server, or other device, a transaction authorization request to the merchant's bank, acquirer 211. The authorization request message includes information 210 pertaining to the proposed transaction, including the name or SKU of the product to be purchased, the billing address of the card, the shipping address to which the thief wants the product delivered, account information of credit card 216, and IP address 220 of the computer from which the thief initiated the transaction, computer 215.

The authorization request message is then sent by acquirer 211 through a payment processing network to service provider 212. The service provider forwards the authorization request to issuer 213, the issuer of credit card 216. Obviously, issuer 213 may not have any idea that card 216 was stolen yet. For example, the true owner of credit card 216 may not realize that her wallet was stolen and thus has not notified issuer 213. Because there are sufficient funds in the victim's account, issuer 213 dutifully sends an authorization approved message back to service provider 212.

Service provider 212 has one or more scoring engines to score the transaction for risk to the merchant. Service provider 211 identifies that the billing address of card 216 and the shipping address specified by the thief do not match. The service provider than checks for accounts that are associated with card 216. For example, the service provider searches its databases for other cards owned by the same person. In the exemplary case, the service provider ascertains that payment card 217 is owned by the same person that owns credit card 216.

Payment card 217 currently has flag 218 indicating an elevated risk on the card. Before the present purchase attempt, the thief had used card 217 to make several gasoline purchases in the last hour, a recognized anomaly. Issuer 219, the issuer of card 217, has therefore flagged payment card account 217 for possible fraud.

The issuers of accounts 216 and 217, issuer 213 issuer 219, respectively, normally do not communicate with one another. They may not be able to communicate with one another about their consumer accounts because of privacy regulations. However, service provider 212 may be privy to fraud flags, risk condition codes or other indicators of elevated risk on payment accounts issued by the different issuers. The service provider can pull together the information for a merchant fraud risk score.

A scoring engine of service provider 212 can assess the risk of fraud of all of the accounts of a consumer using neural networks, statistical models, or other non-determinable and determinable engines. The scoring engine uses inconsistencies between the billing address and the shipping address and the shipping address and the IP address, as well as flag 218, to produce fraud risk score 214. Each mismatch, inconsistency, and other elevated risk is weighted with the merchant's customized weighting selections (e.g., weightings 105-107 in FIG. 1) in order to calculate fraud risk score 214. In the exemplary embodiment, the fraud risk score is inserted in the authorization response message at the service provider and then sent to acquirer 211. The authorization response, with the fraud risk score, is then sent back to merchant 101.

Merchant 101 receives the authorization approval message and fraud risk score and assesses whether he or she wishes to fulfill the order. Based on risk score 214, merchant 101 denies the transaction, even though the issuing bank approved the transaction. Thus, the thief's use of card 216, at least through this merchant, is hindered.

Figure 3:
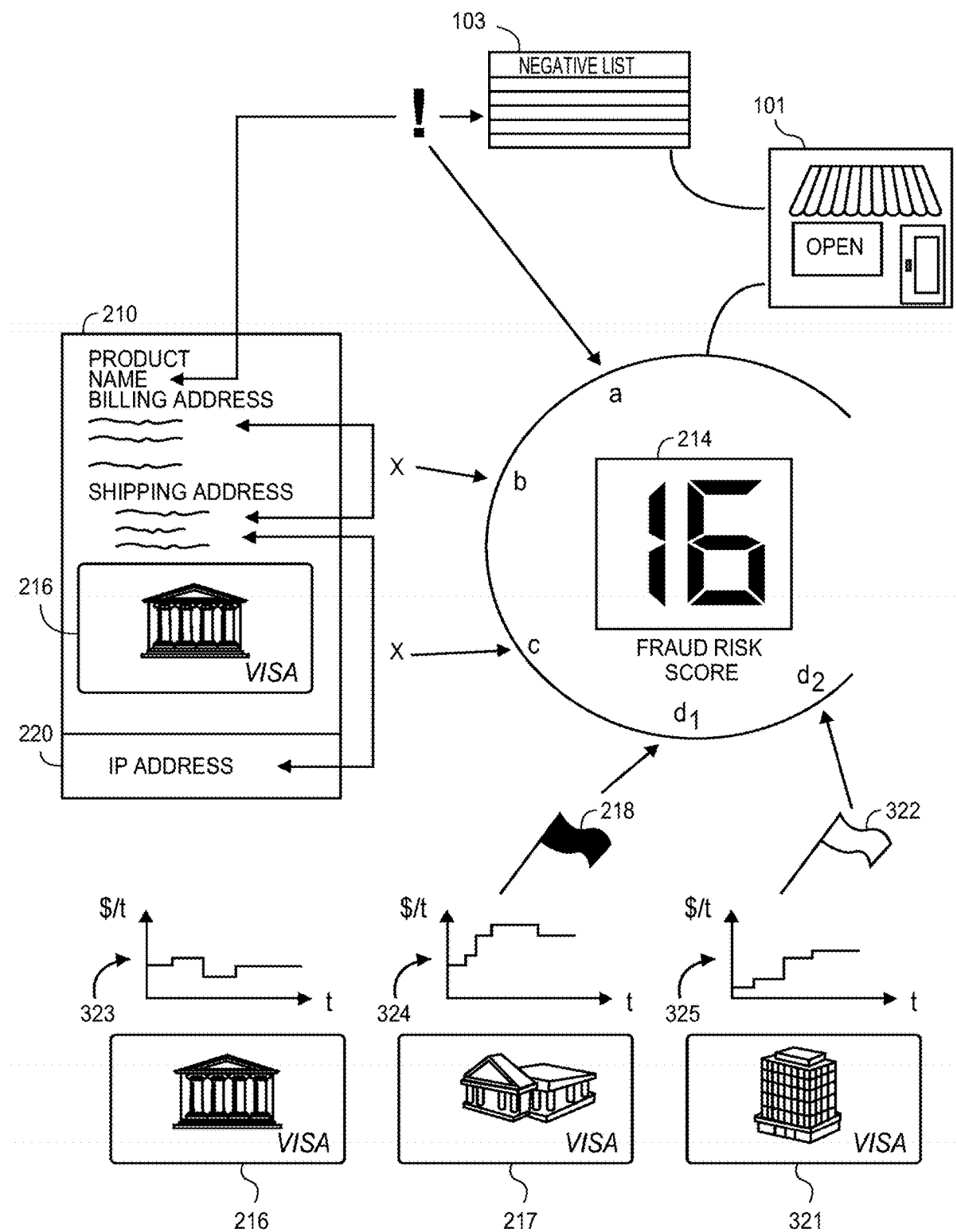
FIG. 3 illustrates weighting different data in accordance with an embodiment.

FIG. 3 illustrates weighting different data in accordance with an embodiment. Information 210 pertaining to the proposed transaction, such as an identifier for the product to be purchased, accountholder name, billing address, etc. are compared for inconsistencies. Negative list 103 is searched for the name of the accountholder. If there is a match, or a close match, then a warning is created and weighted with weighting 'a'. If the billing address does not match the shipping address, then the mismatch is weighted with weighting V. If the shipping and/or billing addresses do not match the geographic location from which the IP address of the consumer's computer enters the purchase order, then this inconsistency is weighted with weighting 'c'.

Credit card 216 may have a flat or normal spending profile with respect to time as indicated by chart 323. However, related card 217 is flagged with flag 218 because its spending velocity has increase as indicated by chart 324. This elevated velocity is weighted with weighting '$d_1$'. Related payment account 321 has a relatively mildly increasing spending profile as indicated by chart 325. It is flagged with a low-level fraud risk flag 322. This low-level fraud risk is weighted with weighting '$d_2$'.

All the weightings were previously entered by merchant 101, and the stored weightings are used to calculate fraud risk score 214. Fraud risk score 214 may be a linear combination of the various weights and fraud risk indicators, nonlinear combination, or calculated by other methods. Such methods are preferably deterministic.

Figure 4:
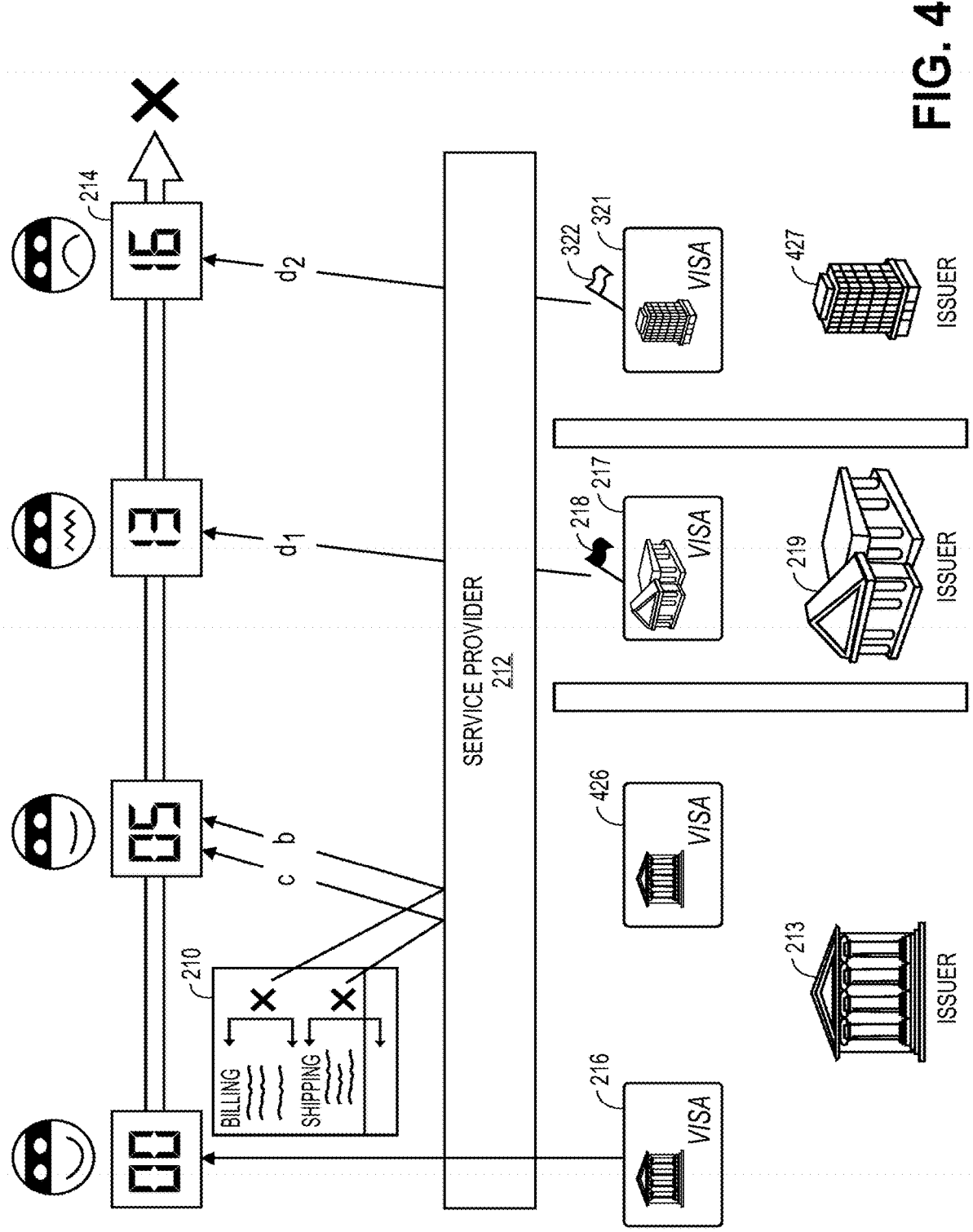
FIG. 4 illustrates modifying a fraud risk score based on multiple accounts in accordance with an embodiment.

FIG. 4 illustrates modifying a fraud risk score based on multiple accounts in accordance with an embodiment. In the exemplary embodiment, the fraud risk score based on a purchase from credit card 216 starts at 00, which indicates no additional risk. Issuer 213 of credit card 216 has nothing to add. Related card 426, owned by the consumer who owns card 216 and issued by issuer 213, experiences no elevated risk. Bank 213 is unaware of possible fraud.

A mismatch between the billing address and shipping address are weighted with 'b', and an inconsistency between the shipping address and IP address of the consumer is weighted with 'c'. The weighted factors are added to the fraud risk score such that it is 05. Service provider 212 determines that the consumer owns other cards, issued by other issuers. Issuer 219 has flagged payment account 217 with flag 218. This indication of elevated risk is weighted with '$d_1$' and added to make the risk score 13. Yet another issuer, issuer 427, has flagged the consumer's other payment account with low-level risk flag 322. This indication of elevated risk is weighted with '$d_1$' and added to make the final fraud risk score 16. Fraud risk score 214 is sent to the merchant, and the thief's attempted fraudulent purchase can be denied.

Although the examples refer to a "card," accounts without associated cards, and accounts that use any valuable consideration, are envisioned.

Figure 5:
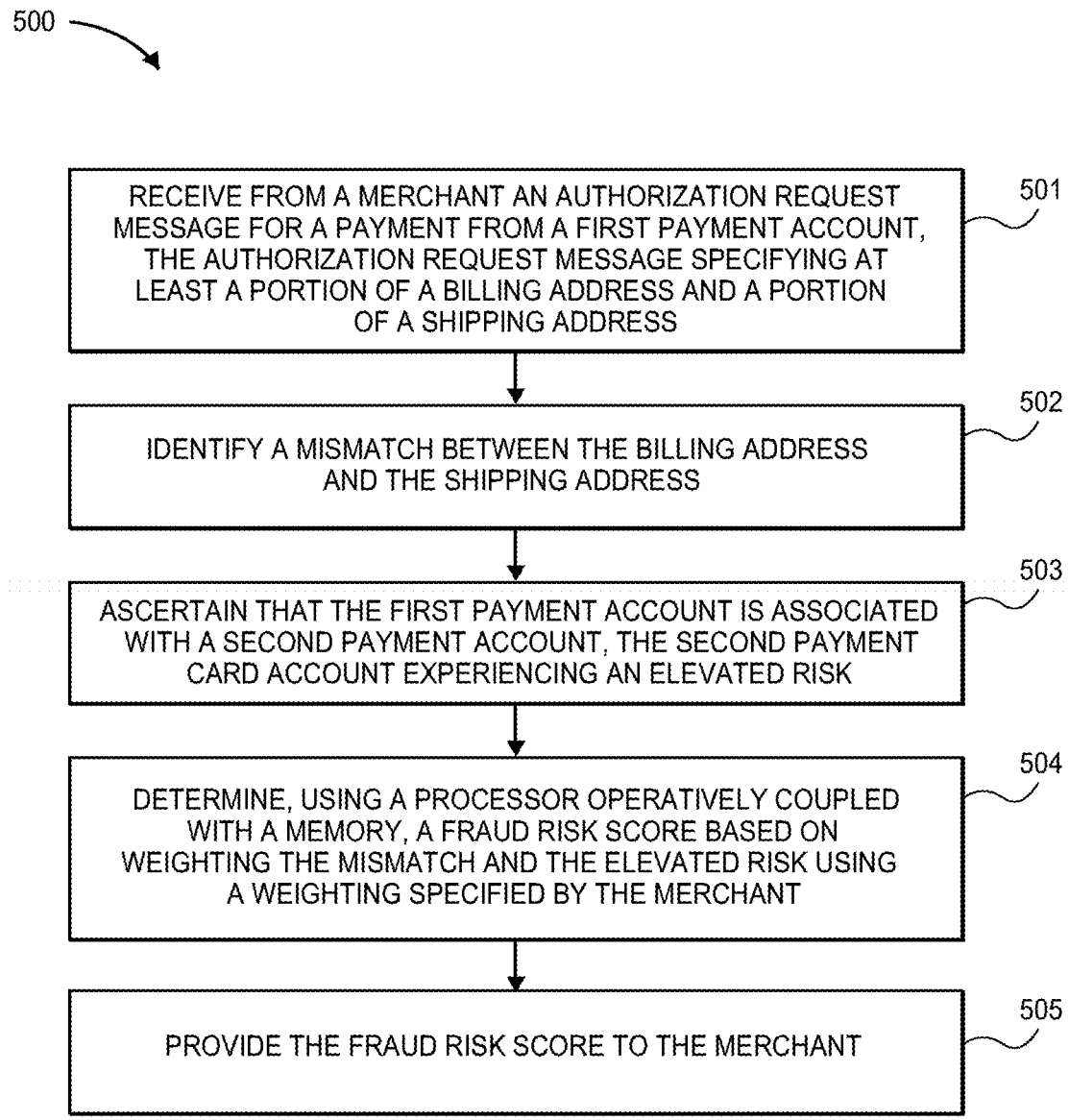
FIG. 5 is a flowchart illustrating a process in accordance with an embodiment.

FIG. 5 is a flowchart illustrating a process in accordance with an embodiment. Process 500 includes operations that are optional. In operation 501, an authorization request message is received from a merchant for a payment from a first payment account, the authorization request message specifying at least a portion of a billing address and a portion of a shipping address. In operation 502, a mismatch between the billing address and the shipping address is identified. In operation 503, it is ascertained that the first payment account is associated with a second payment account. The second payment account is currently experiencing factors indicating an elevated risk. In operation 504, a fraud risk score is determined, using a processor operatively coupled with a memory, based on weighting the mismatch and the elevated risk using a weighting specified by the merchant. In operation 505, the fraud risk score is provided to the merchant.

Figure 6:
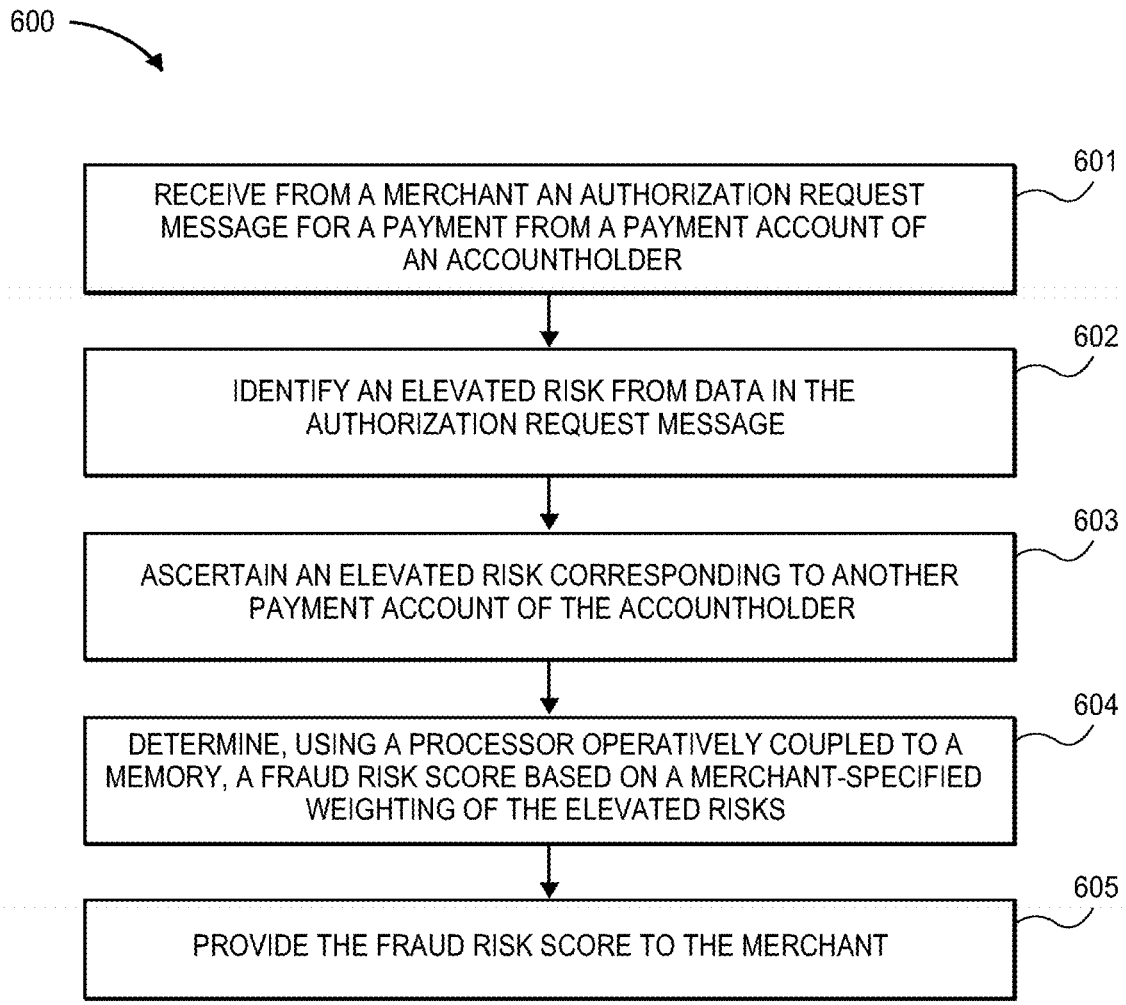
FIG. 6 is a flowchart illustrating a process in accordance with an embodiment.

FIG. 6 is a flowchart illustrating a process in accordance with an embodiment. Process 600 includes operations that are optional. In operation 601, an authorization request message for a payment from a payment account of an accountholder is received from a merchant. In operation 602, an elevated risk is identified from data in the authorization request message. In operation 603, it is ascertained that an elevated risk corresponding to another payment account of the accountholder exists. In operation 604, it is determined, using a processor operatively coupled to a memory, a fraud risk score based on a merchant-specified weighting of the elevated risks. In operation 605, the fraud risk score is provided to the merchant.

Figure 7:
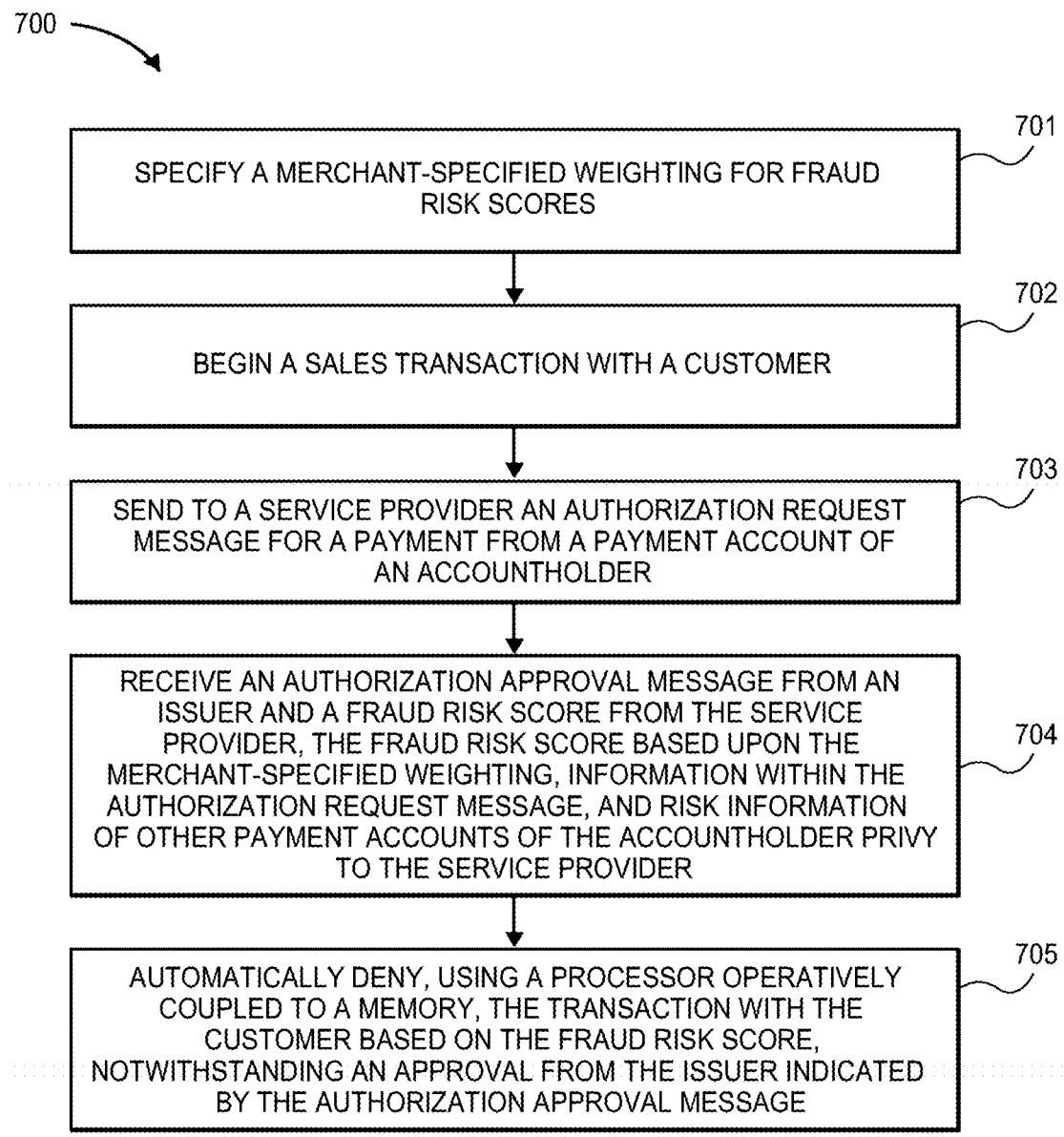
FIG. 7 is a flowchart illustrating a process in accordance with an embodiment.

FIG. 7 is a flowchart illustrating a process in accordance with an embodiment. Process 700 includes operations that are optional. In operation 701, a merchant-specified weighting for fraud risk scores is specified. In operation 702, a sales transaction with a customer is begun. In operation 703, an authorization request message for a payment from a payment account of an accountholder is sent to a service provider. In operation 704, an authorization approval message from an issuer and a fraud risk score from the service provider are received. The fraud risk score is based upon the merchant-specified weighting, information within the authorization request message, and risk information of other payment accounts of the accountholder of which the service provider is privy. In operation 705, the transaction with the customer is automatically denied, using a processor operatively coupled to a memory, based on the fraud risk score, notwithstanding an approval from the issuer indicated by the authorization approval message.

Embodiments of the invention are not limited to the above-described embodiments. For example, although separate functional blocks are shown for an issuer, payment processing network, and acquirer, some entities perform all of these functions and may be included in embodiments of invention.

Figure 8:
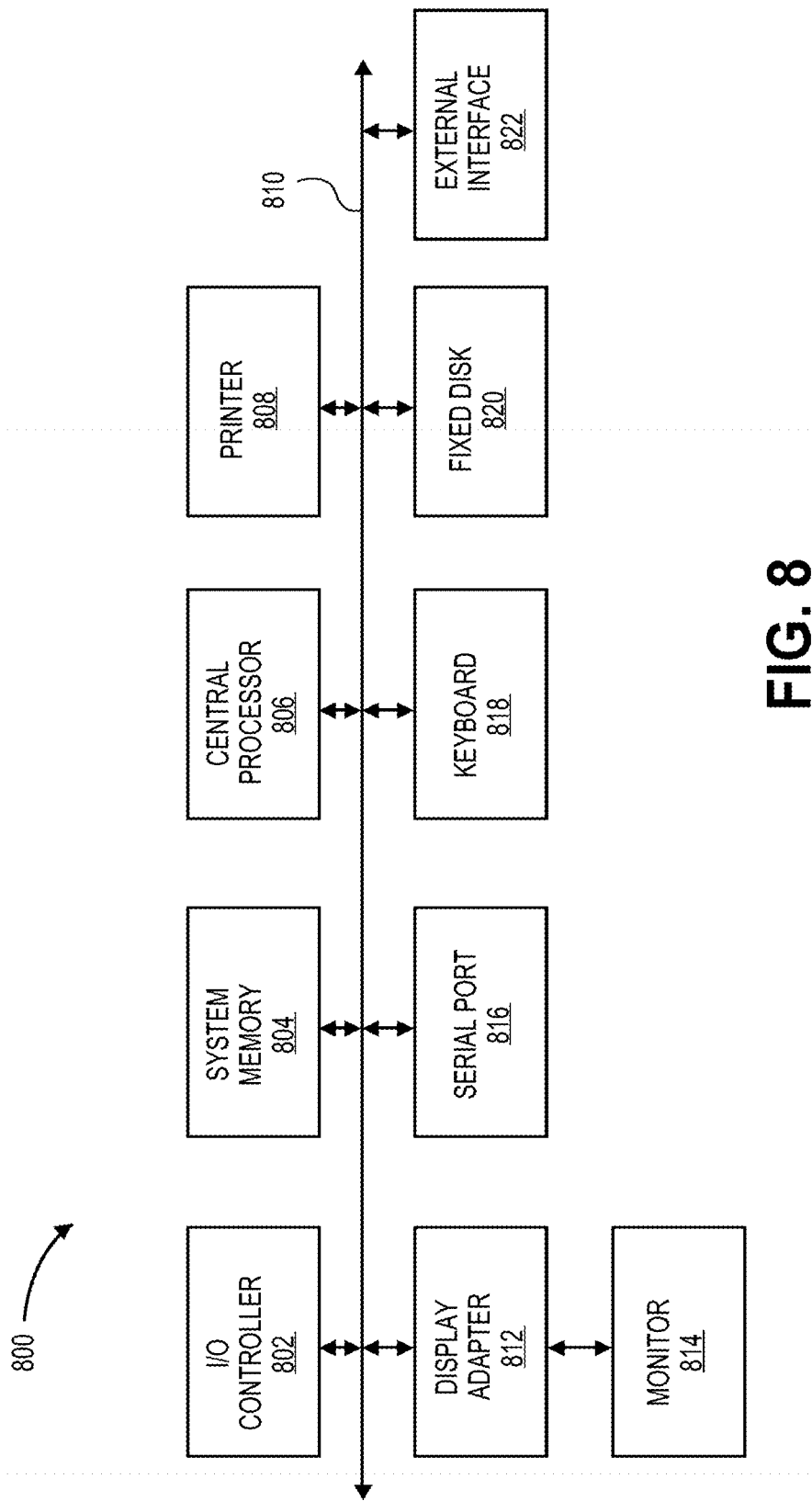
FIG. 8 shows a block diagram of an exemplary computer apparatus that can be used in some embodiments.

FIG. 8 shows a block diagram of an exemplary computer apparatus that can be used in some embodiments. The subsystems shown in the figure are interconnected via a system bus 810. Additional subsystems such as a printer 808, keyboard 818, fixed disk 820 (or other memory comprising computer readable media), monitor 814, which is coupled to display adapter 812, and others are shown. Peripherals and input/output (I/O) devices, which couple to I/O controller 802, can be connected to the computer system by any number of means known in the art, such as serial port 816. For example, serial port 816 or external interface 822 can be used to connect the computer apparatus to a wide area network such as the Internet, a mouse input device, or a scanner. The interconnection via system bus allows the central processor 806 to communicate with each subsystem and to control the execution of instructions from system memory 804 or the fixed disk 820, as well as the exchange of information between subsystems. The system memory 804 and/or the fixed disk 820 may embody a tangible computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
inputting, via a merchant computer, merchant-specified data and weightings for transactions;
receiving, by the merchant computer from a user device, a request to conduct a transaction with a merchant;
transmitting, by the merchant computer to a server computer with a scoring engine, device data corresponding to a device operated by a user in an authorization request message along with first payment account information associated with a first payment account in the transaction,
wherein the server computer determines a fraud risk score based on the device data and the merchant-specified data and weightings, and inserts the fraud risk score in an authorization response message,
wherein the fraud risk score is determined based on a weighting applied to the device data, wherein the device data is weighted based on the merchant-specified data and weightings; and
receiving, by the merchant computer from the server computer, the authorization request message comprising the fraud risk score.

2. The method of claim 1, wherein the device data comprises an Internet protocol (IP) address.

3. The method of claim 1, wherein the server computer searches a database using the first payment account to identify other payment accounts associated with the first payment account, the other payment accounts including a second payment account, determines that second payment account information associated with the second payment account is associated with an elevated risk, and determines that an inconsistency is present between the device data, and an address of the user.

4. The method of claim 1, wherein the authorization request message is transmitted to the server computer via an acquirer computer.

5. The method of claim 1, wherein determining the fraud risk score using the device data comprises weighing, by the server computer, the device data using a weighting specified by the merchant operating the merchant computer.

6. The method of claim 1, wherein the server computer transmits the authorization request message to an issuer computer.

7. The method of claim 6, wherein the issuer computer receives the authorization response message from the issuer computer.

8. The method of claim 1, wherein the transaction is a card not present transaction.

9. The method of claim 8, wherein the device data comprises an IP address.

10. The method of claim 1, wherein the first payment account is a credit card account.

11. The method of claim 1, further comprising:
receiving, by the first payment account information from the device, the device being a user computer.

12. The method of claim 11, wherein the device data is also received from the user computer.

13. A merchant computer comprising:
a processor; and
a memory comprising code, executable by the processor, for implementing a method comprising:
inputting, via the merchant computer, merchant-specified data and weightings for transactions;
receiving, by the merchant computer from a user device, a request to conduct a transaction with a merchant;
transmitting, by the merchant computer to a server computer, device data corresponding to a device operated by a user in an authorization request message along with first payment account information associated with a first payment account in the transaction,
wherein the server computer determines a fraud risk score based on the device data and the merchant-specified data and weightings, and inserts the fraud risk score in an authorization response message,
wherein the fraud risk score is determined based on a weighting applied to the device data, wherein the device data is weighted based on the merchant-specified data and weightings; and
receiving, by the merchant computer from the server computer, the authorization request message comprising the fraud risk score.

14. The merchant computer of claim 13, wherein the device data comprises an IP address.

15. The merchant computer of claim 13, wherein the method further comprises:
receiving, by the first payment account information from the device, the device being a user computer.

16. The merchant computer of claim 13, wherein the transaction is a card not present transaction.

17. The merchant computer of claim 13, wherein the first payment account is a credit card account.

18. The merchant computer of claim 13, wherein the merchant computer is a Web server.

19. The merchant computer of claim 13, wherein the server computer searches a database using the first payment account to identify other payment accounts associated with the first payment account, the other payment accounts including a second payment account, determines that second payment account information associated with the second payment account is associated with an elevated risk, and determines that an inconsistency is present between the device data, and an address of the user.

20. The merchant computer of claim 13, wherein the method further comprises:
providing weightings for different data elements for the transaction and other transactions to the server computer.

* * * * *